(12) United States Patent
Li et al.

(10) Patent No.: US 12,092,540 B2
(45) Date of Patent: Sep. 17, 2024

(54) PACKAGE STRUCTURE FOR DIFFERENTIAL PRESSURE SENSOR, AND ELECTRONIC DEVICE

(71) Applicant: MEMSENSING MICROSYSTEMS (SUZHOU, CHINA) CO. LTD., Suzhou (CN)

(72) Inventors: Gang Li, Suzhou (CN); Jiaxin Mei, Suzhou (CN); Chenglong Shao, Suzhou (CN)

(73) Assignee: MEMSENSING MICROSYSTEMS (SUZHOU, CHINA) CO. LTD., Jiangsu (CN)

( * ) Notice: Subject to any disclaimer, the term of this patent is extended or adjusted under 35 U.S.C. 154(b) by 449 days.

(21) Appl. No.: 17/498,546

(22) Filed: Oct. 11, 2021

(65) Prior Publication Data

US 2022/0026299 A1 Jan. 27, 2022

Related U.S. Application Data

(63) Continuation of application No. PCT/CN2019/112935, filed on Oct. 24, 2019.

(30) Foreign Application Priority Data

Apr. 9, 2019 (CN) .......................... 201910280377.X (51) Int. Cl.
*G01L 13/06* (2006.01)
*G01L 19/06* (2006.01)

(52) U.S. Cl.
CPC .......... *G01L 13/06* (2013.01); *G01L 19/0654* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 10,065,853 B2 9/2018 Golden et al.
10,371,591 B2 8/2019 Wagner et al.
(Continued)

FOREIGN PATENT DOCUMENTS

CN 204612856 U 9/2015
CN 206538189 U 10/2017
(Continued)

OTHER PUBLICATIONS

International Search Report of International Application No. PCT/CN2019/112935 dated Jan. 23, 2020 with English translation, (5p).

*Primary Examiner* — Andre J Allen
(74) *Attorney, Agent, or Firm* — Arch & Lake LLP (57) ABSTRACT

A package structure for a differential pressure sensor, and an electronic device are provided. The package structure includes: a substrate and a housing, an edge of the housing is fixed to a front side of the substrate and defines a first chamber with the substrate; and a pressure sensing element fixed to the front side of the substrate and disposed in the first chamber, the pressure sensing element is provided with a second chamber and a pressure sensing layer, the pressure sensing layer being disposed between the first chamber and the second chamber. The first chamber is connected with the outside via a first through hole, and the second chamber is connected with the outside via a second through hole.

8 Claims, 4 Drawing Sheets

(58) Field of Classification Search
CPC ............. G01L 19/0007; G01L 19/0038; G01L 9/0042; G01L 9/0073; G01L 9/0075; G01L 9/0054; G01L 9/0055; G01L 19/04; G01L 7/10; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0069; G01L 19/0015; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 11/008; G01L 13/026; G01L 7/22; G01L 13/00; G01L 9/0047; G01L 9/0076; G01L 7/08; G01L 9/0025; G01L 9/0035; G01L 9/0005; G01L 19/0061; G01L 9/0041; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/116; G01L 23/22; G01L 9/0036; G01L 9/0061; G01L 9/00369; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/12212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 7/06; G01L 1/2206; G01L 5/228; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/225; G01L 23/32; G01L 7/14; G01L 1/144; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/166; G01L 7/185; G01L 1/255; G01L 21/08; G01L 5/0057; G01L 5/1627; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

2018/0136066 A1    5/2018  Wagner et al.
2020/0173825 A1*   6/2020  Mekias ................... G01F 1/363

FOREIGN PATENT DOCUMENTS

| CN | 107991016 | A |   | 5/2018 | |
|----|-----------|---|---|--------|---|
| CN | 108072487 | A |   | 5/2018 | |
| CN | 109827703 | A |   | 5/2019 | |
| CN | 110082027 | A |   | 8/2019 | |
| CN | 110631759 | A | * | 12/2019 | |
| CN | 111189574 | A | * | 5/2020 | ............. G01L 13/02 |
| CN | 211504505 | U | * | 9/2020 | |

(56) References Cited

FOREIGN PATENT DOCUMENTS

| CN | 213455953 U | * | 6/2021 |
| CN | 213688772 U | * | 7/2021 |
| KR | 101642423 B1 | * | 7/2016 |

* cited by examiner

FIG. 8

PACKAGE STRUCTURE FOR DIFFERENTIAL PRESSURE SENSOR, AND ELECTRONIC DEVICE

CROSS-REFERENCE TO RELATED APPLICATIONS

This application is a continuation of PCT patent application No. PCT/CN2019/112935 filed Oct. 24, 2019, which claims priority to the Chinese patent application No. 201910280377.X filed Apr. 9, 2019, the entire contents of both of which are hereby incorporated by reference for all purposes.

TECHNICAL FIELD

The present disclosure relates to the technical field of sensors, and in particular, relates to a package structure for a differential pressure sensor, and an electronic device.

BACKGROUND

At present, in an electronic device where a gas pressure difference needs to be detected, according to the related art, two gas pressure sensors are typically configured on a PCB board, and whether the differential pressure reaches a threshold is determined by processing pressure differences of the two gas pressure sensors, such that the gas pressure difference is detected However, configuration of two gas pressure sensors increases the cost of the electronic device. In addition, the two gas pressure sensors occupy a large space, and thus small-size design of the product is hard to achieve. Further, the two gas pressure sensors strongly depend on each other, and the product may fail in pressure difference detection once any of the two sensors is damaged. As a result, it is highly risky that the electronic device fails.

Therefore, it is urgent to provide a differential pressure sensor featuring high detection accuracy and high reliability to achieve detection of the gas pressure difference.

SUMMARY

The present disclosure provides a package structure for a differential pressure sensor, and an electronic device.

According to a first aspect of the present disclosure, the present disclosure provides a package structure for a differential pressure sensor. The package structure includes: a substrate and a housing, an edge of the housing is fixed to a front side of the substrate, and a first chamber is defined between the housing and the substrate; and a pressure sensor fixed to the front side of the substrate and disposed in the first chamber, the pressure sensing element comprises a second chamber and a pressure sensing layer, and the pressure sensing layer is disposed between the first chamber and the second chamber; the first chamber is connected with the outside via a first through hole, and the second chamber is connected with the outside via a second through hole.

According to a second aspect of the present disclosure, the present disclosure further provides an electronic device having a package structure for a differential pressure sensor. The electronic device includes: the package structure for the differential pressure sensor as described in the first aspect of the present disclosure; and a first circuit board, the first circuit board comprises a third through hole, and the third through hole is connected with the second through hole in a sealing fashion.

It is to be understood that the foregoing general description and the following detailed description are exemplary and explanatory only and are not restrictive of the disclosure.

DETAILED DESCRIPTION

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Hereinafter, examples illustrating a package structure for differential pressure sensor and an electronic device according to the present disclosure are described in detail.

First Example

Figure 1:
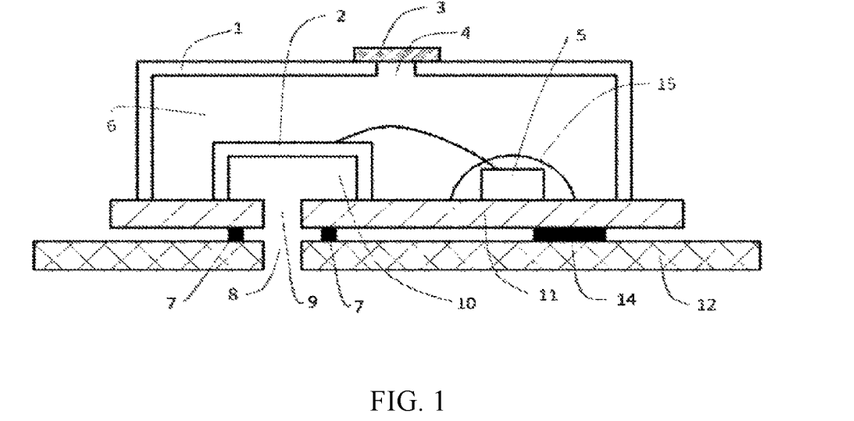
FIG. 1 is a schematic structural diagram of an electronic device according to one or more examples of the present disclosure.

Referring to FIG. 1, a schematic sectional view of an electronic device according to a specific example of the present disclosure is illustrated.

The electronic device includes a package structure for a differential pressure sensor. The package structure includes: a substrate 11 and a housing 1. An edge of the housing 1 is fixed to a front side of the substrate 11, and defines a first chamber 6 with the substrate 11.

The substrate 11 may be made of commonly used materials, for example RF-4, BT, ceramics, or the like.

A soldering point or an electrical connection structure may be formed on the substrate 11, and serves as an electrical connection point.

The substrate 11 may be a single-layer or multi-layer circuit board. A surface of the substrate 11 may be provided with a circuit structure, or an electrical contact portion, for example, a solder pad or the like. The substrate 11 may be further internally provided with an electrical connection structure, configured to be connected to the electrical contact portions on the front side and the rear side of the substrate 11.

The housing 1, serving as a package housing of the differential pressure sensor, is configured to protect electronic elements inside the housing, and meanwhile, defines the first chamber 6 with the substrate 11.

The housing 1 may be made of a metal, the housing 1 is high-temperature resistant, and the manufacture process of the housing 1 is simple. Therefore, the housing may be applicable to mass production. In addition, the housing made of the metal also has characteristics of anti-corrosion, electromagnetic shielding, and good-mechanical properties, such that a product is well protected by the housing.

In other examples, the housing 1 may also be made of other hard materials, for example, plastics or the like, which is not limited herein.

The edge of the housing 1 is fixed to the front side of the substrate 11 by welding, adhesive bonding or the like, such that the first chamber 6 is defined between the housing 1 and the substrate 11.

In this specific example, the housing 1 is provided with a first through hole 4 running through the body of the housing 1, such that the first chamber 6 is communicated with the outside of the housing 1.

The body of the housing 1 is provided with at least one first through hole 4.

In this example, the housing 1 is provided with only one first through hole 4. However, in other examples, the housing 1 may also be provided with more than two first through holes.

The edge of the housing 1 and the substrate 11 are connected in a sealing fashion, such that the first chamber 6 is communicated with the outside of the housing 1 only via the first through hole 4, and gas in the first chamber 6 may not leak at other positions.

The package structure for the differential pressure sensor further includes a pressure sensing element 2, fixed to the surface of the substrate 11 and disposed in the first chamber 6.

The pressure sensing element 2 is a MEMS device, and is provided with a second chamber 10 and a pressure sensing layer 201. The pressure sensing layer is disposed between the first chamber 6 and the second chamber 10.

Figure 2:
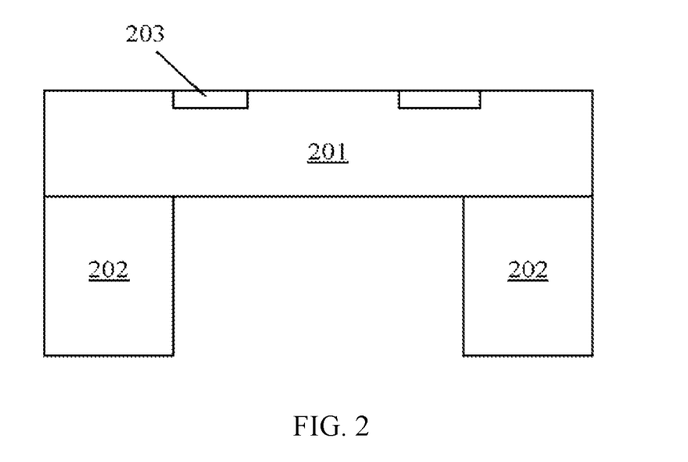
FIG. 2 is a schematic structural diagram of a pressure sensing element of the electronic device according to one or more examples of the present disclosure.

Referring to FIG. 2, a schematic structural diagram of the pressure sensing element 2 of the electronic device according to this example is illustrated.

The pressure sensing element 2 includes the pressure sensing layer 201 and a support structure 202 configured to support an edge of the pressure sensing layer 201. The second chamber 10 is disposed between the pressure sensing layer 201 and the support structure 202.

The pressure sensing layer 201 of the pressure sensing element 2 may include a pressure-sensitive thin film. The pressure-sensitive thin film may be a semiconductor film layer provided with a plurality of pressure-sensitive resistors 203. The plurality of pressure-sensitive resistors 203 constitute a Wheatstone bridge.

The pressure sensing layer 201 is deformed under a pressure, and resistances of the pressure-sensitive resistors 203 vary, such that an output signal of the Wheatstone bridge varies.

In FIG. 1 and FIG. 2, the pressure sensing element 2 is schematically illustrated, the illustration in the drawings does not represent the actual structure of the pressure sensing element 2.

In other examples, the pressure sensing element 2 may be any type of a pressure sensing element provided with a chamber, which, for example, detects a pressure based on capacitance variations.

The substrate 11 is provided with a second through hole 9. The second through hole 9 is communicated with the second chamber 10, and the second chamber is communicated with the outside via the second through hole 9.

In this example, in the substrate 11, only one second through hole 9 is communicated with the second chamber 10. However, in other examples, in the substrate 11, more than two second through holes are communicated with the second chamber 10.

In this example, the first through hole 4 and the second through hole 9 are disposed on two opposite sides of the package structure for the differential pressure sensor.

In other examples, the positions of the first through hole 4, the second through hole 9, and the pressure sensing element 2 may be reasonably defined according to the actual detection needs.

In this example, a surface of the first through hole 4 is covered with a water-repellent ventilative film 3, which is capable of preventing a corrosive substance from entering the first chamber 6.

In other examples, the water-repellent ventilative film may not be disposed.

The water-repellent ventilative film 3 may be made of a hydrophobic material, which may be specifically made of at least one of a PP spunbonded nonwoven fabric, and a PE polymer ventilative film.

In this example, the water-repellent ventilative film 3 is covered on an outer surface of the housing 1. In other examples, a water-repellent ventilative film 3' may also be covered on an inner surface of the housing 1.

In this example, the package structure for the differential pressure sensor further includes an application specific integrated circuit (ASIC) chip 5 in the first chamber 6. The ASIC chip 5 is fixed to a surface of the substrate 11 disposed in the first chamber 6. The ASIC chip 5 is connected to a detection signal output terminal of the pressure sensing element 2 and configured to calculate a differential pressure value based on a detection signal output by the pressure sensing element 2.

Since the pressure sensing layer of the pressure sensing element 2 is disposed between the first chamber 6 and the second chamber 10, gas pressures in the first chamber 6 and the second chamber 10 simultaneously act on the pressure sensing layer of the pressure sensing element 2, such that a pressure eventually suffered by the pressure sensing layer is a pressure difference between the first chamber 6 and the second chamber 10. In this way, the detection signal output by the pressure sensing element 2 corresponds to the pressure difference between the first chamber 6 and the second chamber 10, and then the detection signal output by the pressure sensing element 2 is calculated by using the ASIC chip 5, and thus a corresponding differential pressure value is acquired.

By one pressure sensing element 2, the differential pressure value between two through holes may be detected, and there is no need to dispose a plurality of pressure sensors at different through holes. Therefore, the differential pressure may be reduced such that the differential pressure sensor has a small size and a low cost.

The ASIC chip 5 has high reliability, and low power consumption in the calculation process, such that power consumption is greatly reduced, and standby time of the product is prolonged.

The ASIC chip 5 is connected to detection signal output terminal of the pressure sensing element 2 by gold-wire bonding or other bonding process, such that the differential pressure value is calculated based on the detection signal output by the pressure sensing element 2.

For protection of ASIC chip 5 and the connection line between the ASIC chip 5 and the pressure sensing element 2, in this example, the ASIC chip 5 is further covered with a protective layer 15.

The ASIC chip 5 is configured to output a feedback signal in response to the calculated differential pressure value reaching a threshold, such that output of an invalid signal is prevented, and power consumption is reduced.

Figure 3:
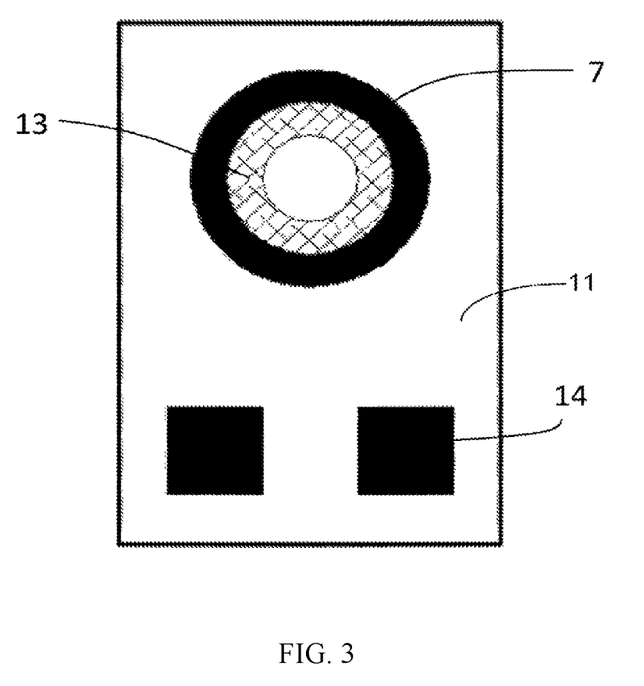
FIG. 3 is a schematic diagram of a rear side of a substrate of a package structure for a differential pressure sensor according to one or more examples of the present disclosure.

Referring to FIG. 3, a schematic diagram of a rear side of the substrate 11 of the package structure for the differential pressure sensor is illustrated.

The package structure for the differential pressure sensor further includes a sealed region l and a solder pad 14 that are disposed on the rear side of the substrate 11.

The sealed region 7 is a closed pattern, specifically, a closed annular shape. A projection of the second through hole 9 in a plane of the sealed region 7 falls within the closed pattern.

In this example, the sealed region 7 is circular.

In other examples, the sealed region 7 may also be rectangular, polygonal, or other irregular closed patterns.

In the case that the substrate 11 is connected to another circuit board, the sealed region 7 is configured to be fixedly connected to the circuit board.

In this example, the sealed region 7 includes a conductive ring, such that the second through hole 9 is connected to a third through hole 8, and the conductive ring is capable of achieving an electrical connection between the substrate 11 and a first circuit board 12. Further, the sealed region 7 may also serve as the ground (GND) terminal in terms of practice of products.

The sealed region 7 may further include an insulative ring, for example, an epoxy resin, a rubber, or the like, which is capable of achieving a good sealing effect.

For improvement of a sealing effect when the sealed region 7 is connected to another circuit board, the sealed region 7 is protruded from the rear side of the substrate 11.

To ensure that the sealed region 7 is protruded from the rear side of the substrate 11, the edge, at least including a solder resist region 13 of the substrate 11 inside the sealed region 7, of the substrate 11 in the sealed region 7 may be polished, etched, or ground to remove a solder resist material on a surface of the solder resist region 13, such that the surface of the solder resist region 13 is obviously lower than the sealed region 7.

The solder resist material may be glass filaments or plastics or the like.

Still referring to FIG. 1, the electronic device further includes a first circuit board 12. The package structure for the differential pressure sensor is fixed to the first circuit board 12.

Specifically, the package structure for the differential pressure sensor is fixed to the first circuit board 12 via the substrate 11.

The first circuit board 12 is provided with a circuit, and thus achieves an electrical connection with the substrate 11.

The ASIC chip 5 is electrically connected to the first circuit board 12 via an electrical connection structure in the substrate 11 and the solder pad 14.

The first circuit board 12 is provided with a functional circuit. A signal output by the ASIC chip 5 serves as an input signal of the functional circuit on the first circuit board 12.

The functional circuit on the first circuit board 12 is capable of processing the signal output by the ASIC chip 5.

In other examples, the first circuit board 12 is further mounted with other electronic elements.

The first circuit board 12 is provided with a third through hole 8. The third through hole 8 is communicated with the second through hole 9 in a sealing fashion, and the second chamber 10 is communicated with the outside via the second through hole 9 and the third through hole 8.

The third through hole 8 is communicated with the second through hole 9 in a sealing fashion, such that external gas, while entering the second chamber 10 via the third through hole 8 and the second through hole 9, may not leak from a position between the first circuit board 12 and the substrate 11. In this way, accuracy of differential pressure detection is improved.

In this example, the rear side of the substrate 11 is fixed to the first circuit board 12 via the sealed region 7 and the solder pad 14.

Projections of the second through hole 9 and the third through hole 8 in a plane where the sealed region 7 is located both fall within the closed pattern, and the sealed region 7 is disposed between the substrate 11 and the first circuit board 12, such that the third through hole 8 is communicated with the second through hole 9.

The number of solder pads 14 and the shape thereof are not limited by the illustration in FIG. 3, and may be reasonably designed according to the actual circuit structure.

In this example, the sealed region 7 is a circular solder pad, and the sealed region 7 and the solder pad 14 are made to be electrically connected to the circuit on the first circuit board 12 by soldering, such that signals are transmitted therebetween.

To prevent liquid or gas from leaking between the first circuit board 12 and the substrate 11 while entering the second through hole 9 from the third through hole 8, the third through hole 8 is communicated with the second through hole 9 in a sealing fashion.

The solder resist region 13 is obviously lower than the sealed region 7, such that the sealed region 7 easily tightly bonds the substrate 11 to the first circuit board 12 via a sealing material, such that air tightness of the product is ensured.

In other specific examples, the sealed region 7 may also be connected to the first circuit board 12 by adhesive bonding. In this case, an adhesive layer or the like sealing material (not illustrated in the drawings) is present between the sealed region 7 and the first circuit board 12, such that the sealed region 7 and the first circuit board 12 are connected to each other in a sealing fashion.

In addition to sealed connection formed between the sealing region 7 and the first circuit board 12 by the solder material, the adhesive or the like material, in other examples, the solder material, the adhesive or the like material may also be further filled at an edge of a joint between the sealed region 7 and the first circuit board 12, to improve sealing performance between the sealed region 7 and the first circuit board 12.

In other examples, the sealed region 7 may also be disposed inside the surface of the substrate 11, and may be at least partially lower than the rear side of the substrate 11 or flush with the rear side of the substrate 11. Sealing connection between the sealed region 7 and the first circuit board 12 is practiced by filling a sealing material between the sealed region 7 and the first circuit board 12 and/or filling the sealing material at edges of the sealed region 7 and the first circuit board 12.

Second Example

Figure 4:
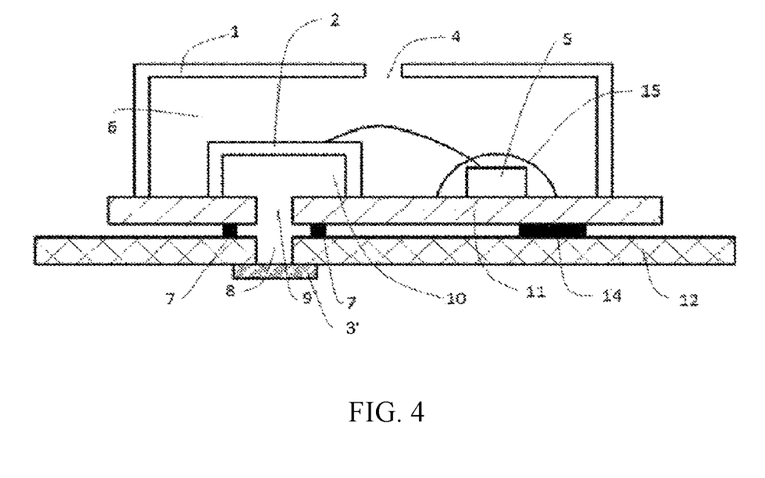
FIG. 4 is a schematic structural diagram of an electronic device according to one or more examples of the present disclosure.

Referring to FIG. 4, a schematic structural diagram of an electronic device according to another example of the present disclosure is illustrated.

In this specific example, the third through hole 8 in the first circuit board 12 is covered with a water-repellent ventilative film 3'.

The water-repellent ventilative film 3' is covered on an outer side surface of the first circuit board 12 facing away from the differential pressure sensor. In other examples, the water-repellent ventilative film 3' may also be covered on an inner side surface of the first circuit board 12.

Generally, a water-repellent ventilation film may be covered on the surface of the through hole on the side where an air flow is applied.

In other examples, a water-repellent ventilation film may be covered on each of the surfaces of the first through hole 4 and the third through hole 8 on two opposite sides of the differential pressure sensor.

In the above example, the package structure for the differential pressure sensor may be horizontally placed to detect gas pressure variations above or under the differential pressure sensor.

Third Example

Figure 5:
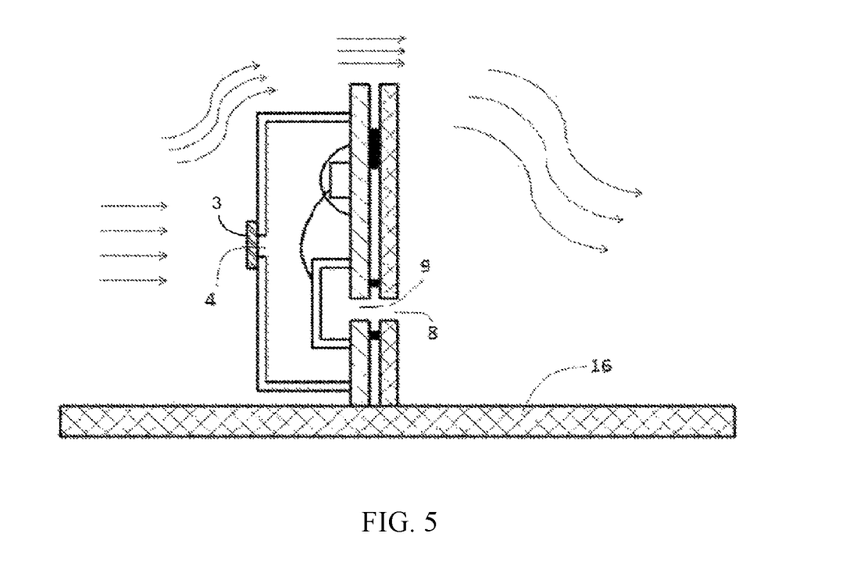
FIG. 5 is a schematic structural diagram of an electronic device according to one or more examples of the present disclosure.

Referring to FIG. 5, a schematic structural diagram of an electronic device according to another example of the present disclosure is illustrated.

In this example, the electronic device detects the gas pressure variation on two sides of the package structure for the differential pressure sensor in the horizontal direction.

Specifically, in this example, the electronic device further includes a second circuit board 16. The substrate 11 and the first circuit board 12 are perpendicularly fixed to the second circuit board 16, such that the first through hole 4 and the third through hole 8 respectively face two opposite sides in the horizontal plane.

The first circuit board 12 and the second circuit board 16 may be electrically connected to each other via a conductive wire.

The first through hole 4 covered with the water-repellent ventilative film 3 is made to face the direction of the air flow. The air flow enters from the first through hole 4, part of the air flow passes through the water-repellent ventilative film 3 and enters the first chamber 6, and the remaining air flow changes the flowing direction along the differential pressure sensor and bypasses the differential pressure sensor and flows to the rear side of the differential pressure sensor. In this case, gas pressures inside the first through hole 4 and the third through hole 8 vary. Therefore, the pressure sensing element outputs a pressure variation signal to the ASIC chip, such that the ASIC chip calculates the differential pressure value.

Fourth Example

Figure 6:
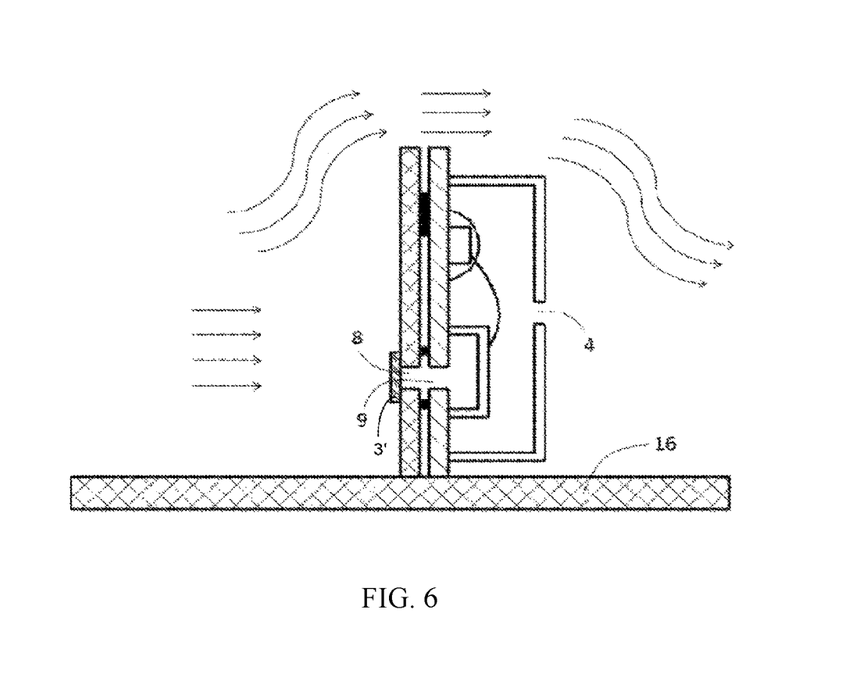
FIG. 6 is a schematic structural diagram of an electronic device according to one or more examples of the present disclosure.

Referring to FIG. 6, a schematic diagram of a package structure for a differential pressure sensor that is perpendicularly used according to another example of the present disclosure is illustrated.

In this example, the water-repellent ventilative film 3' is covered on the third through hole 8. Therefore, the third through hole 8 is made to face the direction of the air flow.

Fifth Example

Figure 7:
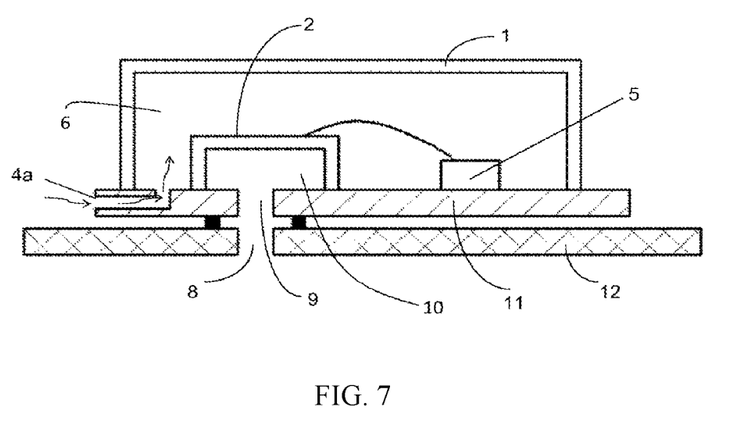
FIG. 7 is a schematic structural diagram of an electronic device according to one or more examples of the present disclosure.

Referring to FIG. 7, in this example, the first chamber 6 of the package structure for the differential pressure sensor is communicated with the outside via the first through hole 4a.

The first through hole 4a runs through the substrate 11 and is communicated with the first chamber 6.

In this example, a gas or liquid inlet direction of the first through hole 4a is parallel to the surface of the substrate 11, and a gas or liquid outlet direction of the first through hole 41 is perpendicular to the surface of the substrate 11.

During use of the electronic device, the first through hole 4a and the third through hole 8 are respectively communicated with different external environments, such that the electronic device is capable of detecting differential pressures under different external environment.

Sixth Example

Figure 8:
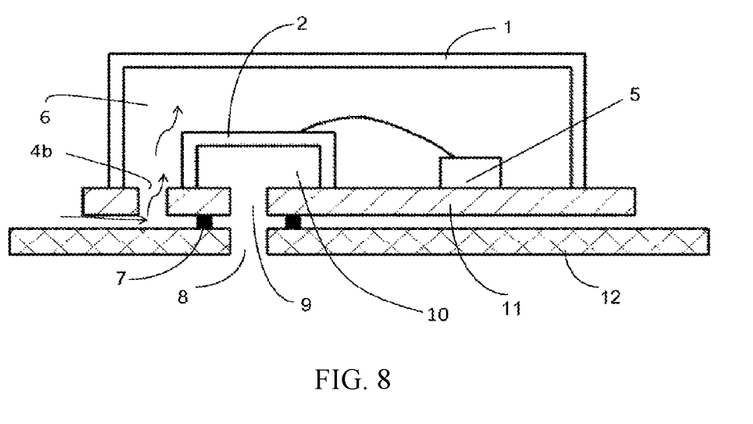
FIG. 8 is a schematic structural diagram of an electronic device according to one or more examples of the present disclosure.

Referring to FIG. 8, in this example, the first chamber 6 between the housing 1 and the substrate 11 of the package structure for the differential pressure sensor is communicated with the outside via the first through hole 4b.

The first through hole 4b runs through the substrate 11 and is communicated with the first chamber 6.

In this example, the first through hole 4b perpendicularly runs through the substrate 11, and is disposed outside the sealed region 7.

The external gas or liquid flows through a gap between the substrate 11 and the circuit board 12, and enters the first chamber 6 via the first through hole 4b.

During use of the electronic device, the first through hole 4b and the third through hole 8 are respectively communicated with different external environments, such that the electronic device is capable of detecting differential pressures under different external environment.

In other examples, the position of the first through hole may be reasonably designed according to factors such as different external environments and positions of the differential pressure to be detected.

Seventh Example

In this example, the electronic device further includes a processor, i.e., a central processing unit (CPU).

The processor is connected to the signal output terminal of the ASIC chip of the differential pressure sensor, and configured to acquire an output signal of the ASIC chip, and triggers a corresponding instruction based on the output signal.

The processor (CPU) may be mounted on the first circuit board 12 (referring to FIG. 1) or the second circuit board 16, and connected to the signal output terminal of the ASIC chip via the functional circuit on the first circuit board 12 and/or the second circuit board 16.

In other specific examples, the processor may be also mounted on other circuit boards, for example, a control board, and connected to the first circuit board 12 or the second circuit board 16 via an inter-board connection line, such that a signal connection between the processor and the signal output terminal of the ASIC chip is practiced, and signal transmission between the processor and the ASIC chip is implemented.

The ASIC chip is configured to send the feedback signal to the processor in response to a differential pressure value detected by the pressure sensing element reaching a threshold.

The processor is configured to be in a standby state with no need of processing instructions related to the differential pressure value in response to the differential pressure value not reaching the threshold.

In the case that the electronic device is in the standby state, the differential pressure sensor automatically detects variations of pressure values at regular intervals.

The pressure sensing element of the differential pressure sensor transmits the detection signal indicative of a has pressure variation to the ASIC chip. The ASIC chip calculates the differential pressure value, and sends a feedback signal to the process in response to the gas pressure variation reaching a predetermined threshold. In response to the feedback signal, the processor triggers the related instruction.

Prior to the differential pressure value reaching the predetermined threshold, the processor may be in the standby state, and power consumption is reduced.

Since power consumption of the ASIC chip is far less than that of the processor, the solution of calculating the differential pressure value and then feeding back a valid differential pressure value to the processor by the ASIC chip reduces power consumption of the electronic device and prolongs standby time of the electronic device.

In addition, the electronic device has a simple structure, and is suitable for mass production.

According to a first aspect of the present disclosure, the present disclosure provides package structure for a differential pressure sensor. The package structure includes: a substrate and a housing, wherein an edge of the housing is fixed to a front side of the substrate and defines a first chamber with the substrate; and a pressure sensing element fixed to the front side of the substrate and disposed in the first chamber, wherein the pressure sensing element is provided with a second chamber and a pressure sensing layer, the pressure sensing layer being disposed between the first chamber and the second chamber; wherein the first chamber is communicated with the outside via a first through hole, and the second chamber is communicated with the outside via a second through hole.

Optionally, the first through hole runs through the housing, and the second through hole runs through the substrate.

Optionally, the first through hole and the second through hole both run through the substrate.

Optionally, the first through hole and the second through hole are disposed on two opposite sides or the same side of the package structure for the differential pressure sensor.

Optionally, the package structure further includes: an application specific integrated circuit (ASIC) chip fixed to the front side of the substrate disposed in the first chamber; wherein the ASIC chip is connected to a detection signal output terminal of the pressure sensing element and configured to calculate a differential pressure value based on a detection signal output by the pressure sensing element.

Optionally, a surface of the ASIC chip is covered with a protective layer.

Optionally, the ASIC chip is configured to output a feedback signal in response to the calculated differential pressure value reaching a threshold.

Optionally, a rear side of the substrate is provided with a sealed region, wherein the sealed region is a closed pattern, and a projection of the second through hole in a plane of the sealed region falls within the closed pattern.

Optionally, the sealed region protrudes from the rear side of the substrate or is flush with the rear side of the substrate.

Optionally, the sealed region includes a conductive ring or an insulative ring.

The present disclosure further provides an electronic device having a package structure for a differential pressure sensor. The electronic device includes: the package structure for the differential pressure sensor as described above; and a first circuit board, wherein the first circuit board is provided with a third through hole, the third through hole being communicated with the second through hole in a sealing fashion.

Optionally, in the case that a rear side of a substrate of the package structure for the differential pressure sensor is provided with a sealed region, the sealed region is disposed between the substrate and the first circuit board and fixed to the first circuit board by soldering or adhesive bonding, such that the third through hole is communicated with the second through hole in a sealing fashion.

Optionally, the electronic device further includes: a water-repellent ventilative film configured to cover the first through hole and/or the third through hole.

Optionally, the electronic device further includes: a second circuit board, wherein the substrate and the first circuit board are perpendicularly fixed to the second circuit board, and the first circuit board and the second circuit board are electrically connected.

Optionally, in the case that the package structure for the differential pressure sensor is provided with an application specific integrated circuit (ASIC) chip, the ASIC chip is connected to the first circuit board by an electrical connection structure in the substrate.

Optionally, the electronic device further includes: a processor, connected to a signal output terminal of the ASIC chip, and configured to acquire a feedback signal output by the ASIC chip.

Optionally, the ASIC chip is configured to send the feedback signal to the processor in response to a differential pressure value detected by the pressure sensing element reaching a threshold.

Optionally, the processor is configured to be in a standby state in response to the differential pressure value not reaching the threshold.

The package structure according to the present disclosure, only one pressure sensing element is provided. A pressure sensing layer of the pressure sensing element is disposed between a first chamber and a second chamber. The first chamber and the second chamber are each provided with a through hole. Therefore, a differential pressure value between the first chamber and the second chamber may be detected by the single pressure sensing element.

Since only one pressure sensing element is provided, the package structure is simple, the size is small, and the cost is low.

Further, the package structure for the differential pressure sensor further includes an ASIC chip configured to calculate a differential pressure value based on a detection signal output by the pressure sensing element.

Since the ASIC chip has low power consumption, power consumption is greatly reduced as compared with the case of calculating the differential pressure value by the processor of the device.

In the electronic device according to the present disclosure, the first circuit board is fixed to the substrate of the differential pressure sensor, and the through hole in the first circuit board is communicated with the through hole in the substrate in a sealing fashion, such that entered gas is prevented from leaking between the first circuit board and the substrate, and thus accuracy of detection is improved.

Further, the electronic device further includes a processor connected to the ASIC chip of the differential pressure sensor. The ASIC chip sends feedback information to the processor in response to the differential pressure value reaching a threshold.

Therefore, the processor is not enabled in real time, such that power consumption of the electronic device is reduced, and standby time is prolonged.

Described above are examples of the present disclosure. Other examples of the present disclosure will be apparent to those skilled in the art from consideration of the specification and practice of the present disclosed. This disclosure is intended to cover any variations, uses, or adaptations of the disclosure such departures from the present disclosure as come within known or customary practice in the art. It is intended that the specification and examples be considered as exemplary only, with a true scope and spirit of the present disclosure being indicated by the following claims.

It will be appreciated that that the present disclosure is not limited to the exact construction that has been described above and illustrated in the accompanying drawings, and that various modifications and changes may be made without departing from the scope thereof. It is intended that the scope of the present disclosure only by the appended claims.

What is claimed is:

1. An electronic device, comprising:
 a package structure for a differential pressure sensor, wherein the package structure further comprises:
  a substrate and a housing, wherein an edge of the housing is fixed to a front side of the substrate, and a first chamber is defined between the housing and the substrate; and
  a pressure sensor fixed to the front side of the substrate and disposed in the first chamber, wherein the pressure sensor comprises a second chamber and a pressure sensing layer, and the pressure sensing layer is disposed between the first chamber and the second chamber;
  wherein the first chamber is connected with outside via a first through hole, and the second chamber is connected with the outside via a second through hole; and
 a first circuit board, wherein the first circuit board comprises a third through hole, and the third through hole is connected with the second through hole.

2. The electronic device according to claim 1, wherein in case that a rear side of a substrate of the package structure comprises a sealed region, the sealed region is disposed between the substrate and the first circuit board and fixed to the first circuit board by soldering or adhesive bonding, such that the third through hole is connected with the second through hole in a sealing fashion.

3. The electronic device according to claim 1, further comprising: a water-repellent ventilative film configured to cover the first through hole or the third through hole.

4. The electronic device according to claim 1, further comprising: a second circuit board, wherein the substrate and the first circuit board are perpendicularly fixed to the second circuit board, and the first circuit board and the second circuit board are electrically connected.

5. The electronic device according to claim 1, wherein in case that the package structure comprises an application specific integrated circuit (ASIC) chip, the ASIC chip is connected to the first circuit board by an electrical connection structure in the substrate.

6. The electronic device according to claim 5, further comprising: a processor, connected to a signal output terminal of the ASIC chip, and configured to acquire a feedback signal output by the ASIC chip.

7. The electronic device according to claim 6, wherein the ASIC chip is configured to send the feedback signal to the processor in response to a differential pressure value detected by the pressure sensor reaching a threshold.

8. The electronic device according to claim 7, wherein the processor is configured to be in a standby state in response to the differential pressure value not reaching the threshold.

* * * * *